UNITED STATES PATENT OFFICE.

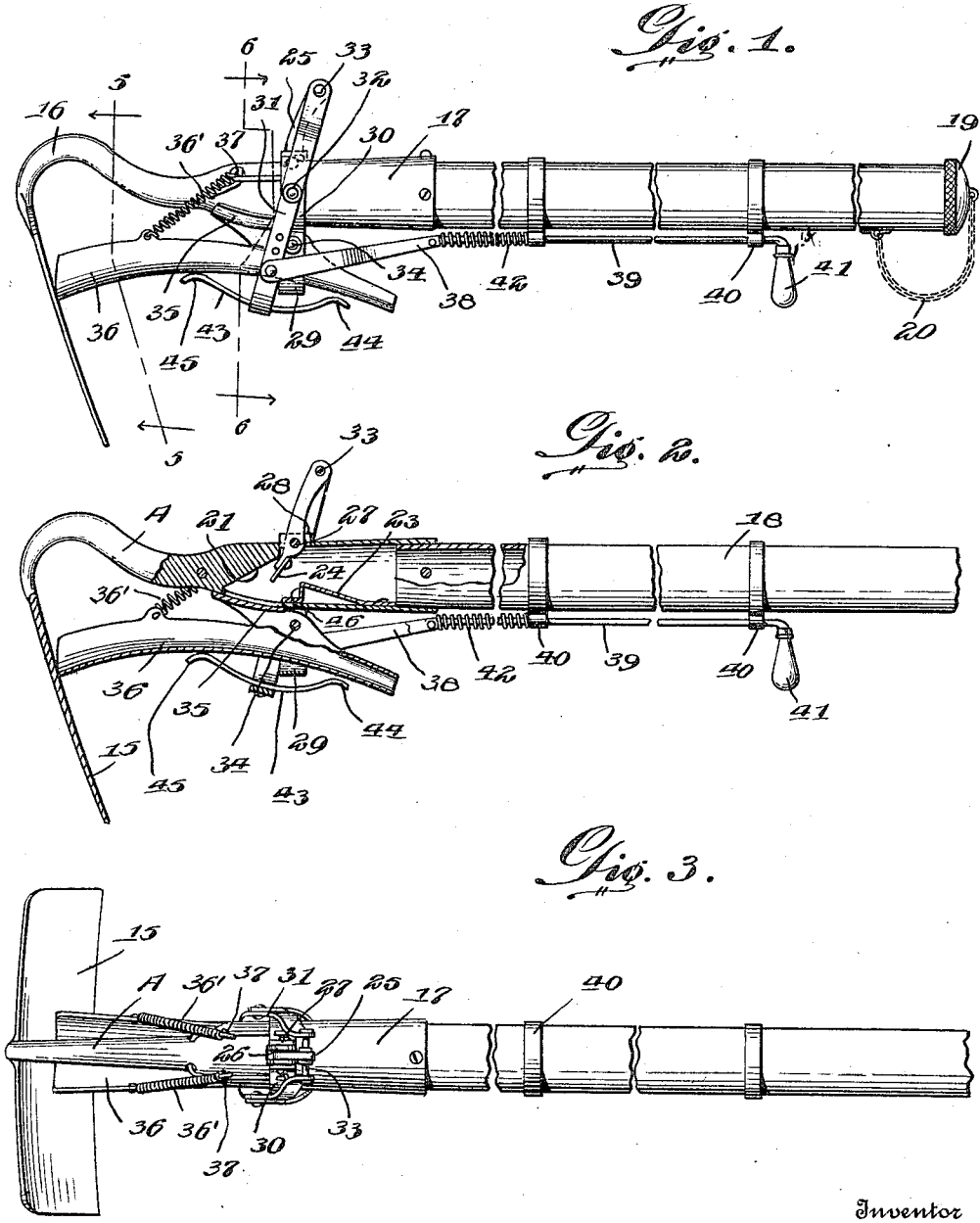

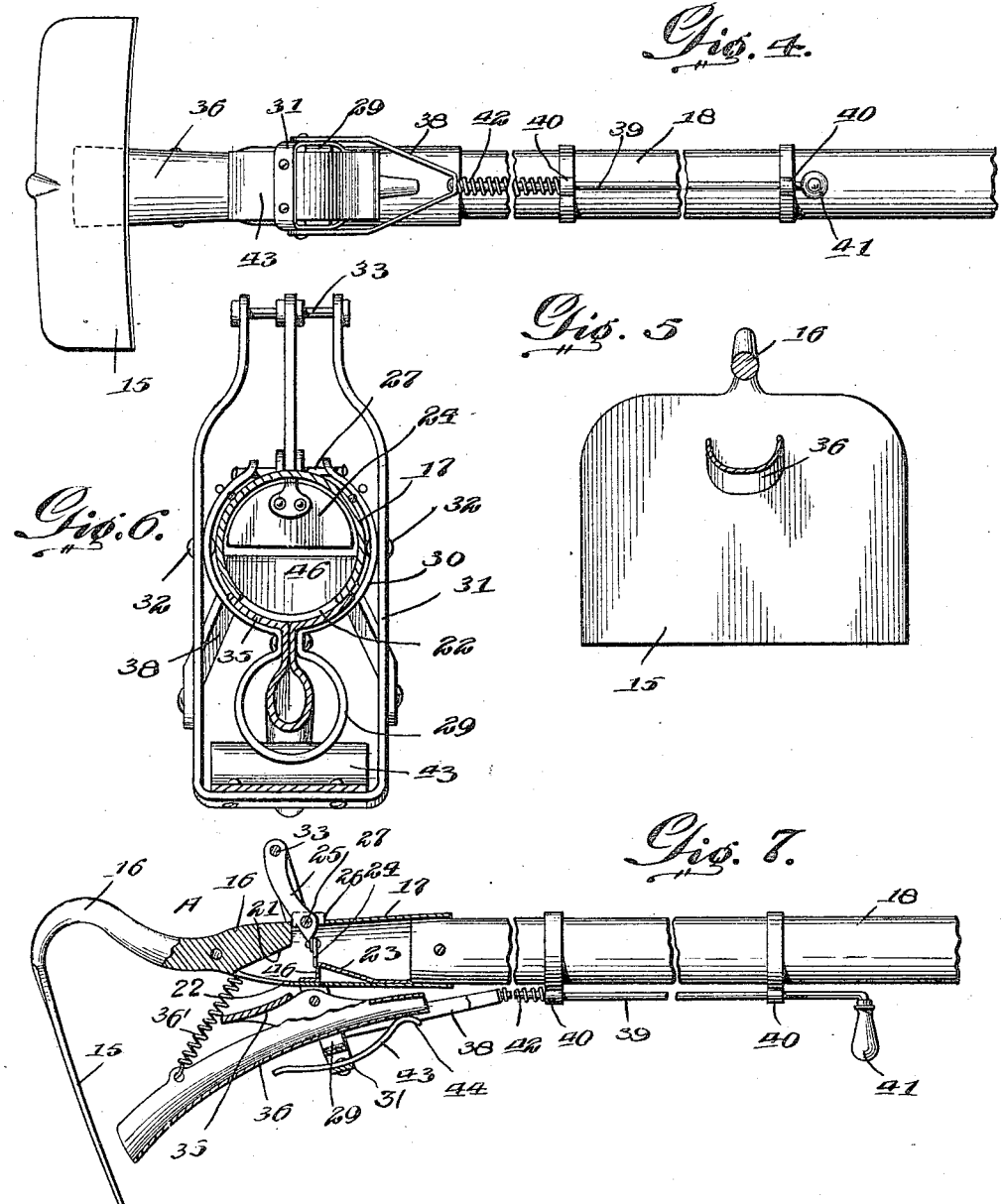

EMANUEL WILBANKS, OF MOBILE, ALABAMA.

COMBINED HOE AND SEED-PLANTER.

1,182,826.

Specification of Letters Patent.

Patented May 9, 1916.

Application filed January 24, 1916. Serial No. 73,942.

*To all whom it may concern:*

Be it known that I, EMANUEL WILBANKS, a citizen of the United States, residing at Mobile, in the county of Mobile and State of Alabama, have invented new and useful Improvements in Combined Hoes and Seed-Planters, of which the following is a specification.

This invention relates to combined hoes and seed planters.

The invention has for its object to produce a hoe having a cutting blade of ordinary construction, said hoe being equipped with a seed planting attachment for depositing seed in an opening in the ground formed by the hoe blade.

A further object of the invention is to produce a seed planting hoe having a handle which constitutes a seed receptacle, means for governing the discharge of seed from the handle, and means for conveying the seed so discharged to an opening in the ground formed by the blade.

A further object of the invention is to produce a seed planting hoe having a cutting blade, a seed compartment, discharging means and a movably supported chute for conveying the seed to an opening in the ground formed by the blade, said chute being operable by spring actuated means whereby the said chute is normally held in contact with the blade whereby it is obstructed.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a side elevation of a hoe constructed in accordance with the invention. Fig. 2 is a longitudinal sectional view taken through the blade and through a portion of the handle. Fig. 3 is a top plan view of the parts seen in Fig. 2. Fig. 4 is a bottom plan view of the said parts. Fig. 5 is a transverse sectional view taken on the line 5—5 in Fig. 1. Fig. 6 is a transverse sectional view taken on the line 6—6 in Fig. 1. Fig. 7 is a longitudinal sectional view showing the parts in seed discharging position.

Corresponding parts in the several figures are denoted by like characters of reference.

The hoe blade 15 which is of conventional construction is provided with a shank A having a solid portion 16 and a tubular portion 17, said tubular portion being of tapering shape. The said tubular portion is connected with a tubular handle 18 having a detachable cap 19, which latter may have threaded engagement with said handle and which is preferably connected therewith by a chain 20 to prevent its being accidentally lost.

The tubular portion or socket portion 17 of the shank A is provided with an inclined front wall 21 to the rearward of which a discharge opening 22 for seed is formed in the bottom portion of the socket. To the rearward of the discharge opening is located an inclined projection 23 over which seed must pass to the discharge opening, the constricted portion or opening between the apex of the inclined projection 23 and the top wall of the socket portion 17 being obstructed by a flexible valve 24 made of rubber or other appropriate material, said valve being carried by a stem or shank 25 which projects through a slot 26 in the top wall of the socket, said stem being pivotally mounted on a pin 27 which is carried by struck up flanges 28 adjacent to the sides of the slot. The means for actuating the valve stem 25 for the purpose of moving the valve to the open and closed positions shown, respectively, in Figs. 2 and 7 will be hereinafter more fully described.

29 designates a yoke, the limbs of which have swelled portions 30 that surround the socket portion 17 on which the said yoke is pivotally supported by means of the pin 27 which also supports a pivoted valve stem or shank 25. A second yoke 31 has its limbs connected by pivot members 32 with the swelled portions of the limbs of the yoke 29, the upwardly extended portions of the limbs of the yoke 31 being connected by a transverse pin 33 with the upper end of the valve stem or shank 25, which latter will thus be actuated by rocking movement of the yoke 31.

Pivotally mounted in the bight of the yoke 29 by a pin or pivot member 34 is a gate member 35 with which a discharge chute 36 is rigidly connected. The gate member 35 serves to normally obstruct the discharge opening 22, while the discharge chute 36, which is longitudinally as well as transversely of arcuate form, somewhat resembling the implement formally known as a shoe horn, serves to receive the seed discharged through the opening 22 over the gate 35 when the latter is open and to conduct such seed to an opening which has been formed in the ground by means of the hoe blade 15. The gate member 35 is normally maintained in obstructing position, as seen in Fig. 2, by the action of springs 36' which connect the forward portion of the discharge chute with eyes 37 that are secured or formed externally on the socket member 17.

For the purpose of actuating the yoke 31 and related parts, the said yoke is connected by links 38 with the pull rod 39 guided in bearings 40 on the tubular handle 18, said pull rod having a handle 41 whereby it may be conveniently manipulated. A spring 42 serves to actuate the pull rod and related parts in a forward direction, that is to say, in the direction of the hoe blade, thus serving incidentally to move the yoke 29 in the same direction. The yoke 31 carries in the bight thereof a cam member 43 having upturned front and rear ends, said cam member serving when the yoke 31 is rocked in a rearward direction to rock the combined gate member and discharge chute to permit grain to pass through the discharge opening 22 and over the chute, this rocking movement being effected by the upturned rearward end 44 of the cam member 43 engaging the underside of the rearward portion of the chute 36 which will thus be rocked against the tension of the springs 36', as best seen in Fig. 7. When the yoke 31 is rocked in a forward direction, the upturned forward portion 45 of the cam member 43 will engage the underside of the chute member 36 forwardly of the pivot member 34, thereby assisting the springs 36' in moving the gate 35 to an obstructing position with respect to the discharge opening 22.

It will be seen that when the yoke 31 and related parts are rocked to move the gate 35 to a closed position, the upwardly extending portions of the limbs of said yoke 31 will at the same time actuate the stem or shank 28 of the valve 24, moving the latter to an open position, permitting seen to pass over the apex of the inclined projection 23 to the measuring chamber which may be defined as the bottom portion of the tubular socket member lying in advance of the apex of the projection 23. When the gate 35 is thrown open, the valve 24 will be moved in engagement with the offset portion or shoulder 46 of the projection 23, thereby obstructing communication between the seed compartment and the measuring chamber.

From the foregoing description, taken in connection with the drawings hereto annexed, the operation and advantages of this invention will be readily understood. The hoe and the parts thereof may be made in any desired dimensions and proportions for the planting of various kinds of seed, such as corn, beans, peanuts and the like. The blade of the hoe may be used for grass cutting and weeding in the customary manner. When seed is to be planted the hoe blade is utilized for cutting an opening of the proper depth, after which the seed depositing mechanism is actuated by means of the pull rod 39. The charge of seed when deposited in the ground may be covered by the use of the hoe blade.

Having thus described the invention, what is claimed as new, is:—

1. In a self planting hoe, a blade having a shank provided with a tubular socket portion and a tubular handle connected therewith, a valve transversely obstructing the tubular socket portion and having a stem extending upwardly therethrough, the tubular socket portion being provided with a discharge opening, a tiltable gate normally obstructing said discharge opening, and means for simultaneously actuating the valve and the gate to move one to an open and the other to an obstructing position.

2. In a device of the class described, a hoe blade having a shank provided with a tubular socket portion, a tubular handle connected therewith and constituting a seed compartment, an inclined projection in the tubular socket portion, said socket portion having a discharge opening in advance of said projection, a stem extending upwardly through the tubular socket portion and carrying a flexible valve engaging the inclined projection, a spring actuated member having a gate to obstruct the discharge opening, and a connection between the spring actuated member and the valve carrying stem, whereby the latter will be actuated to move the valve to a non-obstructing position when the gate is closed.

3. In a device of the class described, a hoe blade having a shank provided with a tubular socket portion, said socket portion having a discharge opening, a slot in its upper portion, bearing flanges adjacent to said slot, and an inclined projection arranged interiorly behind and adjacent to the discharge opening, a pivot pin engaging the bearing members, a stem pivoted on said pin and carrying a valve coöperating with the inclined projection within the socket member, a yoke mounted on the pivot pin and having swelled side members surrounding the socket member, a spring actuated member carried by the yoke and having a gate to obstruct the discharge opening, a second yoke pivoted on the first mentioned yoke and having upwardly extending limbs connected with the valve carrying stem, a cam member carried in the bight of the second yoke and having upturned ends adapted for engagement with the spring actuated member having the obstructing gate, and means connected with the second yoke for rocking the same to produce movement of the parts connected therewith.

4. In a device of the class described, a socket member having a discharge opening at its lower part and a slot in its upper portion, a tubular handle connected with the socket and constituting a seed receptacle, a pivoted stem carrying a flexible valve adapted to obstruct communication between the seed compartment and the discharge opening, a pivotally supported yoke, a spring actuated pivoted member carried by the yoke, said member including a gate to obstruct the discharge opening and a discharge chute, a yoke pivotally connected with the first mentioned yoke, a pin connecting the limbs of the second yoke with the valve carrying stem, a cam member carried in the bight of the second yoke and having upturned ends adapted to engage the spring actuated member carried by the first mentioned yoke, keepers secured on the tubular handle, a spring actuated pull rod guided in said keepers, and links connecting said pull rod with the second yoke.

In testimony whereof I affix my signature in presence of two witnesses.

EMANUEL WILBANKS.

Witnesses:
Geo. B. Cleveland, Jr.,
R. W. Nicolls.

Copies of this patent may be obtained for five cents each, by addressing the "Commissioner of Patents, Washington, D. C."